United States Patent [19]

Sargent

[11] 4,405,485
[45] Sep. 20, 1983

[54] ION SELECTIVE COMPOSITION

[75] Inventor: Roger N. Sargent, Midland, Mich.

[73] Assignee: The Dow Chemical Company, Midland, Mich.

[21] Appl. No.: 700,654

[22] Filed: Jan. 25, 1968

[51] Int. Cl.$^3$ ............................................... C02F 5/10
[52] U.S. Cl. .................................... 252/180; 210/263; 252/427; 252/449; 210/687; 210/688
[58] Field of Search ............... 252/427, 428, 449, 455, 252/454, 463, 476, 180; 210/38 A, 38 B, 38 R, 263

[56] References Cited

U.S. PATENT DOCUMENTS 3,193,493 7/1965 Bourguet et al. ................ 252/454 X
3,433,821 3/1969 Hamilton et al. ................ 252/454 X

*Primary Examiner*—Stephen J. Lechert, Jr.

[57] ABSTRACT

This invention concerns new ion selective compositions comprising insoluble alumino silicates deposited in a porous substrate and to methods for preparing such compositions. These materials are found to be useful for the detection, extraction and concentration of certain ions, particularly lithium, cesium, beryllium, strontium, lanthanum, manganese and nickel.

4 Claims, No Drawings

ION SELECTIVE COMPOSITION

This invention relates to new compositions of matter useful in the removal of metal ions from aqueous solutions thereof and more particularly relates to cellulosic material, preferably in the form of a fabric, within which $NaAl(SiO_3)_2$ has been formed, to methods for preparing such composition and to methods for employing such compositions to remove lithium and other metal ions from aqueous solutions.

It is an object of this invention to provide a composition useful in the concentration and removal of metal ions from dilute aqueous solutions thereof. A further object is to provide a process for preparing a composition capable of removing and concentrating metal ions from dilute aqueous solutions thereof. A still further object is to provide a process whereby metal ions including lithium are concentrated and removed from dilute aqueous solutions thereof. These and other objects and advantages of the present composition and process will become apparent from a reading of the following detailed description.

It has been discovered that cellulosic substrates containing $Al^{+++}$ ions as the result of contact with a soluble aluminum salt and which are subsequently treated with $Na_2SiO_3$ or $K_2SiO_3$ to produce the corresponding $NaAl(SiO_3)_2$ or $KAl(SiO_3)_2$ constitutes a novel composition capable of concentrating and removing metal ions from aqueous solutions thereof. While such compositions are capable of concentrating a wide variety of cations, it is particularly unexpected that lithium ions are significantly concentrated thereby as it is known that lithium is the most difficult of the cations to be removed from aqueous solutions by an ion-exchange mechanism.

In accordance with the present invention, a base material of substantially any cellulosic material may be employed, conveniently in the form of cloth or fabric. Phosphorylated cotton has been found particularly advantageous as a substrate and is therefore preferred. Other functional forms of cotton such as the phosphonate, sulfonate and the like, however, have been found not to be suitable for use herein. The phosphorylated cotton may be prepared by any of the known methods such as that discovered by Daul et al in Industrial and Engineering Chemistry, Vol. 46, pages 2187 et seq. (1954).

To prepare one embodiment of the composition of this invention, phosphorylated cotton is converted to the $NaAl(SiO_3)_2$ or $KAl(SiO_3)_2$ form by contact with a soluble aluminum salt and with a solution of $Na_2SiO_2$ or $K_2SiO_2$. Preferably the phosphorylated cotton is first contacted with an aqueous solution of a suitable aluminum salt such as $Al_2(SO_4)_3$ for a time sufficient for conversion of such cotton to the $Al^{+++}$ form and rinsed to remove any excess salt. This material is then preferably padded with an aqueous solution of $Na_2SiO_3$ or $K_2SiO_3$, e.g., a 10 percent by weight solution, in order to precipitate insoluble $NaAl(SiO_3)_2$ or $KAl(SiO_3)_2$, rinsed with deionized water and dried. When other forms of cellulose such as untreated cotton cloth or paper are employed as the substrate, they are first contacted with a water soluble salt such as $Al_2(SO_4)_3$ to entrap $Al^{+++}$ ions. A solution $Na_2SO_3$ or $K_2SO_4$ is then added to precipitate $NaAl(SiO_3)_2$ or $KAl(SiO_3)_2$ within the interstitial spaces of the substrate.

In order to concentrate and remove cations from water containing the same, the composition defined herein is contacted with the ion-containing water by any suitable method. For example, the cation-containing aqueous solution may be passed through a column packed with the composition of this invention or passed through one or more membranes made thereof. For the purpose of ion detection and analysis of ion-containing water, a sample of water may be taken and contacted by stirring or other suitable means with the composition of this invention.

After contact with the cation-containing water, analysis of the treated cellulose composition by atomic absorption, mass spectrometry, radiochemical analysis, or other suitable methods shows the ions have been removed from the water and the concentration of such ions, including lithium, is sufficient to enable the detection of trace amounts.

In order to demonstrate the capacity of the composition of this invention to concentrate cation, a concentration factor is employed. The term "concentration factor" or "C.F." as used herein is determined at equilibrium and is defined by the following formula:

$$C.F. = \frac{\text{Concentration of Cation in the Cation Absorber, ppm}}{\text{Concentration of Cation in the Aqueous Solution, ppm}}$$

The following examples are provided to further illustrate the invention but are not to be construed as limiting to the scope of such invention.

EXAMPLE 1

A 80 g piece of phosphorylated cotton lawn was repeatedly immersed in a fresh 5 weight percent solution of $Al_2(SO_4)_3$ to convert the phosphorylated cotton into the $Al^{+++}$ form. At the end of this period, the treated cloth was removed from the $Al_2(SO_4)_3$ solution and washed with deionized water to remove any excess $Al_2(SO_4)_3$. The cloth was then padded with a 10 weight percent solution of $Na_2SiO_3$ in water, the cloth was air dried at room temperature and washed with deionized water. Typical analysis of the cloth by atomic absorption showed it to contain 0.84% Al and 0.04% Na.

A 1.186 g sample of the treated cloth prepared as above was employed as a cation absorber by immersing it in 300 ml of Lake Huron water containing 1.95 ppm $Li^+$ as LiCl and mixing for a period of 20 minutes. At the end of this period, the cation absorber was removed from the water, dried and analyzed for $Li^+$ by atomic absorption. The remaining water was analyzed by atomic absorption for lithium and the concentration factor was found to be 221.

EXAMPLE 2

A similar experiment was conducted employing a 19.1 g sample of the fabric cation absorber prepared in Example 1. The sample was immersed in a natural water containing $Li^+$ ions. After immersion for 24 hours, the fabric sample was analyzed for both $^6Li$ and $^7Li$. Sufficient lithium ions had been concentrated in the cation absorber to show that the ratio of $^7Li/^6Li$ contained in the sample was 9.86 rather than the naturally occurring ratio of 12.8.

EXAMPLE 3

In substantially the manner of Example 1, samples of water containing 5 ppm of different cations were contacted with samples of the fabric cation absorber prepared in Example 1. Equilibrium was established at a pH of 5 and the following concentration factors were obtained:

| Ion | C.F. | Ion | C.F. |
|---|---|---|---|
| $K^+$ | 71 | $VO^{++}$ | 23 |
| $Rb^+$ | 159 | $Co^{+++}$ | 164 |
| $Cs^+$ | >25,000 | $Mn^{++}$ | 7,960 |
| $Be^{++}$ | 15,700 | $Fe^{+++}$ | 75 |
| $Mg^{++}$ | 3,540 | $Ru^{+++}$ | 131 |
| $Ca^{++}$ | 1,730 | $Co^{++}$ | 5,310 |
| $Sr^{++}$ | 10,400 | $Ni^{++}$ | 6,200 |
| $Ba^{++}$ | >3,700 | $Pd^{++}$ | 382 |
| $Y^{+++}$ | >913 | $Cu^{++}$ | 2,120 |
| $La^{+++}$ | 9,830 | $Ag^+$ | 28 |
| $Ce^{+++}$ | 143 | $Au^{+++}$ | 242 |
| $Pm^{++}$ | 5,200 | $Zn^{++}$ | >1,750 |
| $Th^{++}$ | 84 | $Cd^{++}$ | >4,340 |
| $UO_2^{++}$ | 925 | $Al^{+++}$ | 193 |
| $ZrO^+$ | 669 | $Tl^+$ | 1,070 |

Similar results are obtained when the phosphorylated cotton fabric is in the $KAl(SiO_3)_2$ form rather than the $NaAl(SiO_3)_2$ form except, of course, for the capacity of such cation absorber to concentrate $K^+$ ions.

Various modifications can obviously be made within this invention without departing from the spirit or scope thereof and I therefore limit myself only as defined in the appended claims.

I claim:

1. A composition of matter capable of removal of cations from water and the concentration of such cations which comprises a cellulose substrate containing precipitated $NaAl(SiO_3)_2$ or $KAl(SiO_3)_2$ therein.

2. The composition of claim 1 wherein the substrate is phosphorylated cotton.

3. A process for preparing compositions capable of removing cations from aqueous solutions thereof which comprises contacting a cellulose substrate with an aqueous solution containing $Al^{+++}$ ions and an aqueous solution of $Na_2SiO_3$ or $K_2SiO_3$ to cause precipitation thereon of $NaAl(SO_3)_2$ or $KAl(SO_3)_2$, respectively.

4. The process of claim 3 wherein the cellulose substrate is phosphorylated cotton.

* * * * *